(No Model.) 2 Sheets—Sheet 1.
H. HENNEBERG & R. O. LORENZ.
REGULATOR FOR ELECTRIC ARC LAMPS.
No. 353,305. Patented Nov. 30, 1886.
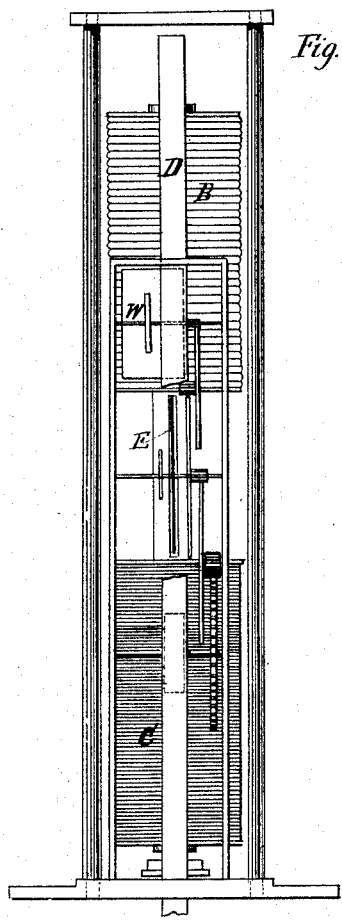
Fig. 1
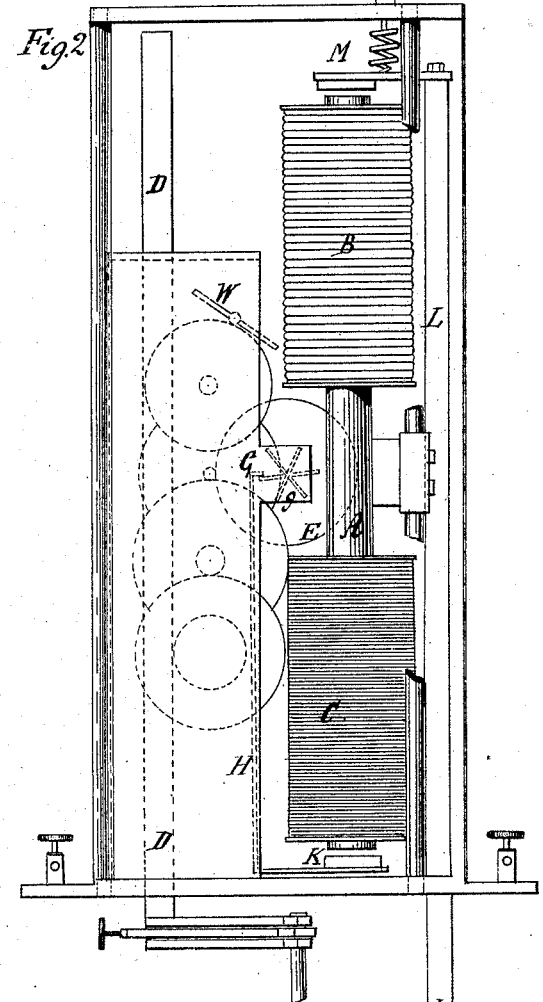
Fig. 2
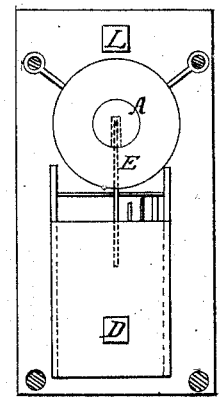
Fig. 3
Witnesses:
J. Vetter
J. A. Rae
Inventors:
H. Henneberg
R. O. Lorenz
by H. Hadden
Atty
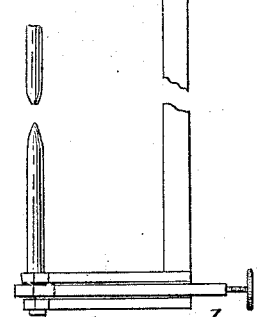

(No Model.) 2 Sheets—Sheet 2.
H. HENNEBERG & R. O. LORENZ.
REGULATOR FOR ELECTRIC ARC LAMPS.
No. 353,305. Patented Nov. 30, 1886.
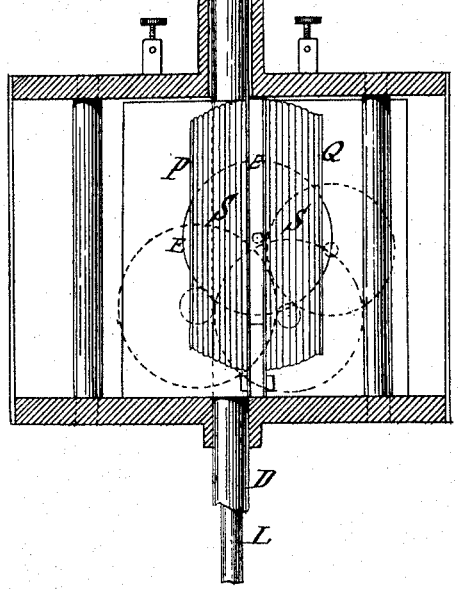
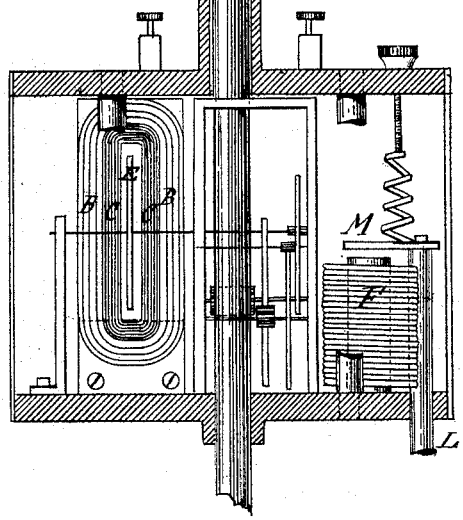
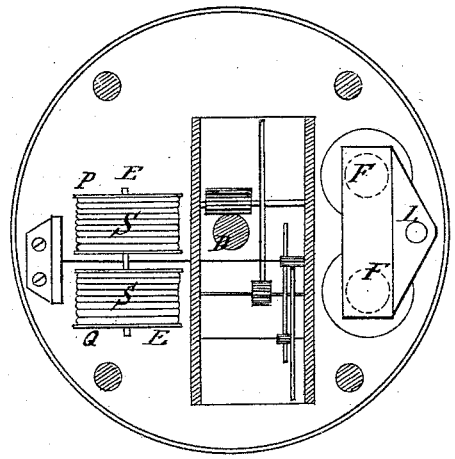
Witnesses:
Inventors:

United States Patent Office.

HUGO HENNEBERG AND RICHARD O. LORENZ, OF VIENNA, AUSTRIA-HUNGARY.

REGULATOR FOR ELECTRIC-ARC LAMP.

SPECIFICATION forming part of Letters Patent No. 353,305, dated November 30, 1886.

Application filed December 29, 1885. Serial No. 186,982. (No model.) Patented in Germany August 6, 1884, No. 31,235; in Austria-Hungary October 6, 1884, No. 28,902 and No. 45,668, and in England July 28, 1885, No. 9,064.

*To all whom it may concern:*

Be it known that we, HUGO HENNEBERG and RICHARD O. LORENZ, subjects of the Emperor of Austria-Hungary, and residing at Vienna, Austria-Hungary, have invented a new and useful Improvement in Regulators for Electric-Arc Lamps, (for which we have obtained patents in Germany, August 6, 1884, No. 31,235; in Austria-Hungary, October 6, 1884, No. 28,902 and No. 45,668; in England, July 28, 1885, No. 9,064,) of which the following is a specification.

The present invention relates to improvements in regulators for electric arc lamps.

The characteristic feature of the present invention is the use of the magnetic action upon rotating iron bodies or other paramagnetic bodies at a distance for the regulation of the arc in electric-arc lamps. This kind of regulator offers the peculiar advantage that the carbons are fed continually in the ratio of their consumption, so that the length of the arc, the resistance of the same, and the strength of the current are maintained practically constant.

This regulator consequently differs from all others hitherto used, which regulate with the alteration of current, inasmuch as it feeds the carbons under constant electric current. For this purpose the weight of a rack serving as one of the carbon-holders and meshing with a toothed pinion is used for turning a disk of iron, and the speed of rotation of this disk is influenced by the action at a distance of electro-magnets.

In Sheet 1 of the annexed drawings, Figures 1 and 2 represent two elevations, and Fig. 3 a horizontal section of an arc lamp constructed according to this invention.

Upon the pole-shoe A, which has a slit, inside of which the disk E rotates, is mounted the main-current electro-magnet B, as well as the shunt-circuit electro-magnet C. The rack D is connected with the disk E and fan W by means of a train of tooth-wheels, as indicated in the drawings, or by any other suitable gearing capable of securing a great speed of rotation.

L is the other carbon-holder, which is capable of movement in a vertical direction and of being drawn down by an armature, M.

H is a locking device, which has for its object to prevent the rack D from dropping when the lamp is not in action. This is effected by a pawl, G, which is connected with an armature, K, attached to the double armed lever H, and meshes with a ratchet-wheel, g, keyed upon the axis of the iron disk E.

The lamp works in the following manner: When the carbons are out of contact the entire current passes through the shunt-circuit magnet C, in consequence of which this latter attracts the armature K, which moves the angular lever H, which at G releases or disengages the ratchet-wheel g. The disk E now commences to rotate, and the rack D is sinking until the carbons come in contact. Now the main circuit is closed and the electro-magnet B attracts the armature M, so that the arc is formed. On the other hand, the pole-shoe A is magnetized, whereby the motion of the disk, and hence of the rack connected with one of the carbons, (in the present case the upper one,) is completely stopped. By the gradual consumption of the carbons the resistance of the arc is gradually and constantly increasing, in consequence of which the force of the shunt-circuit electro-magnet C is also constantly increasing; but since the magnetism which C generates in A is opposed to that generated by B the pole-shoe is decreasing in magnetic force in ratio to the increase of the arc, and the disk commences to rotate, first slowly, but with increasing speed, because the decrease of the magnetism in A lasts as long as the arc is increasing in length. Nevertheless, no further decrease of magnetism can take place in A as long as the speed of the disk is exactly proportional (and therefore the feed of the carbons exactly equal) to the speed at which the carbons are consumed, and henceforth the length of the arc, and consequently its resistance, must remain constant.

The disk, as well as the pole-shoe, is of soft iron. It is a matter of course, however, that other paramagnetic bodies may be used to advantage, and that in place of the disk shape a ring, ball, cylinder, or any other shape may be employed for the body rotating in the pole-shoe.

Instead of employing a pole-shoe with electro-magnets mounted at both sides of it, the equally-named poles at both sides of the iron disk may be produced by inclosing the disk itself with two bobbins, so as to resemble the core of a solenoid, inside of which the disk is free to rotate, and which bobbins contain two coils—namely, one, B, of thick wire, through which the main current passes, while the other, C, of thinner wire, forms a shunt-circuit to the arc. These two coils must be formed in such a manner, that if, for instance, the coil traversed by the main current produces in the iron disk at P a north pole and at Q a south pole the shunt-coil will produce the opposite poles—that is to say, at P a south pole and at Q a north pole. The effect of these two coils upon the iron disk, and the regulation of the consumption of the carbons thereby produced, is the same as with the use of magnets and one pole-shoe, since the main current, by producing magnetic poles in the disk at P and Q, reduces its speed of motion, while the shunt-current by weakening these poles counteracts this decrease.

The arrangement of the rack and of the train of gearing is illustrated in Figs. 4, 5, and 6 of the annexed drawings. It is similar to that first described with reference to Figs. 1, 2, and 3, except that in order to produce the arc it is necessary to employ an electro-magnet, F, (situated or included in the main circuit,) and an armature, M.

What we claim is—

1. In electric-arc lamps, the combination of a thick wire coil placed in circuit with the carbons with a thin wire coil placed in a shunt-circuit and wound in opposite direction to the main coil, a disk of paramagnetic material adapted to turn on its axis and placed so that the two wire coils have an opposite inductive action on the said disk, and mechanism for converting the rotary motion of the disk into an advancing or receding motion of one of the carbons, and vice versa, for the purpose of regulating the distance between the carbons, substantially as described.

2. In electric-arc lamps, the combination of a thick wire coil placed in a circuit with the carbons with a thin wire coil placed in a shunt-circuit and wound in opposite direction to the main coil, a pole-shoe or core common to both coils and adapted to be magnetized by the same in opposite direction, a disk of paramagnetic material adapted to turn in a slot of the said pole-shoe without contact with the latter, and mechanism for converting the motion of the disk into a feed-motion of one of the carbons, and vice versa, substantially as and for the purpose described.

3. A regulator for electric-arc lamps, comprising in its construction a rack, D, serving as one of the carbon-holders, an iron disk, E, adapted to turn on its axis, mechanism intermediate the disk E and the rack D, a slotted pole-shoe, A, provided with main coil B and shunt-coil C, and adapted to act on the disk E by induction, and a stopping device, G $g$ H K, substantially as and for the purpose described.

In testimony whereof we have signed this specification in the presence of two subscribing witnesses.

HUGO HENNEBERG.
RICHARD O. LORENZ.

Witnesses:
EDMUND JUSSEN,
OTTO SCHIFFER.